D. E. HOFFMAN.
SUNSHADE FOR AUTOMOBILES.
APPLICATION FILED JUNE 6, 1917.
1,286,633.
Patented Dec. 3, 1918.
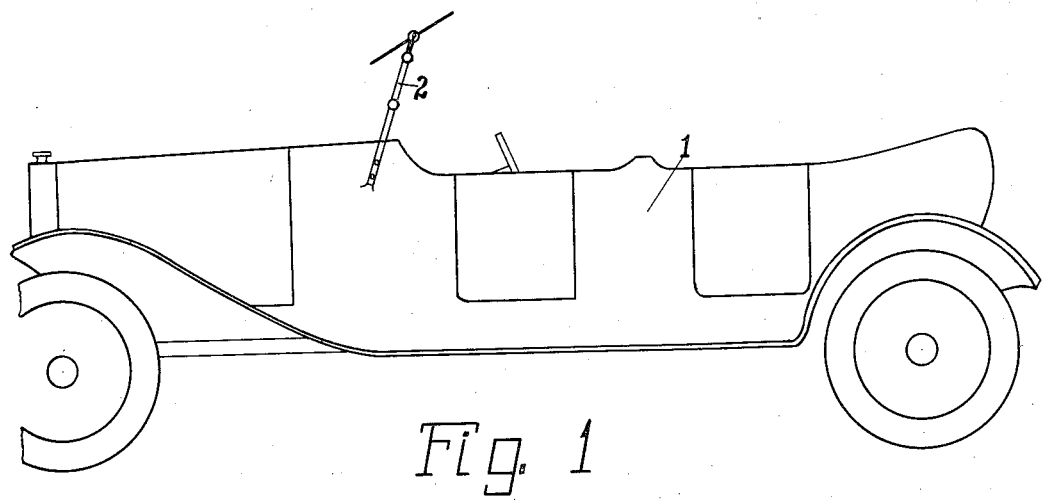
Fig. 1
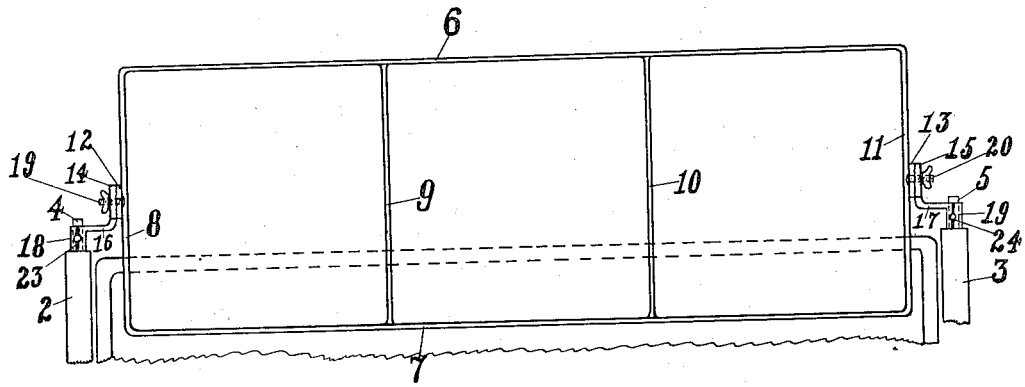
Fig. 2
Fig. 3
INVENTOR.
Daniel E. Hoffman.
BY
Carlos P. Griffin
ATTORNEY.

UNITED STATES PATENT OFFICE.

DANIEL E. HOFFMAN, OF SAN FRANCISCO, CALIFORNIA.

SUNSHADE FOR AUTOMOBILES.

1,286,633.  Specification of Letters Patent.  Patented Dec. 3, 1918.

Application filed June 6, 1917. Serial No. 173,233.

*To all whom it may concern:*

Be it known that I, DANIEL E. HOFFMAN, a citizen of the United States, residing at San Francisco, in the county of San Francisco, State of California, have invented a new and useful Sunshade for Automobiles, of which the following is a specification in such full and clear terms as will enable those skilled in the art to construct and use the same.

This invention relates to a sunshade for the wind shield of an automobile, and its object is to prevent the glare of the sun from fatiguing the eyes when looking through the ordinary glass wind shield.

It will be understood by those skilled in the art that most modern automobiles are equipped with glass wind shields, and that many of them are provided with a pair of lugs at the top of the wind shield to which the automobile top is ordinarily fastened when it is raised. However when the top is down, the glare of the sun on the glass of the wind shield is extremely fatiguing upon the eyes, and often when in just the proper position, the sunlight will practically prevent the driver from seeing through the wind shield.

An object of this invention is to provide a shade which will prevent the direct rays of the sun from falling upon the wind shield, and thereby prevent the glass from reflecting light into the eyes of the driver.

Other objects of the invention will appear as the description proceeds.

An embodiment of the invention is shown in the drawings in which the same reference numeral is applied to the same portion throughout, but I am aware that there may be modifications thereof.

Figure 1 is a side elevation of an automobile showing a wind shield to which this sunshade is applied, Fig. 2 is a front elevation of the sunshade showing the positions of the wind shield to which it is secured, and Fig. 3 is a top plan view of one of the fixtures which support the sunshade.

The numeral 1 represents the body of the automobile, 2 and 3 the side posts of the wind shield, said side posts each having projecting lugs 4 and 5 at their tops, as shown in Fig. 2. The sunshade comprises a rectangular frame composed of longitudinal members 6 and 7, connected together with cross members 8 to 11 inclusive. The end members 8 and 11 are connected to the frame disks 12 and 13 which are notched on one side as indicated in Fig. 3, to register with similar notches on disks 14 and 15 carried by the arms 16 and 17. Each of the arms 16 and 17 is provided with a socket to receive the lugs 4 and 5, as indicated at 18 and 19. The disks 12, 14 and 13, 15 are connected by means of the bolts 19 and 20, each bolt having a wing nut to tighten it up on the side plates, while allowing the adjustment of the sunshade when said bolts are loosened. The shade members are provided with winged screws 23, 24, in order that they may be tightened on the tops of the posts 2 and 3.

Any suitable opaque cloth may be used to cover the frame forming the sunshade, and the sunshade may be tilted to any desired position, as the sun or driving conditions may demand.

Having thus described my invention what I claim as new and desire to secure by Letters Patent of the United States, is as follows, express reservation being made of permissible modification.

1. The combination with the wind shield of an automobile of a sunshade therefor comprising a pair of detachable supporting brackets to connect with the windshield, a rectangular frame having an opaque covering, lugs at the mid-portion of the ends of the shade for its support, and means to hold it in any given adjustment with respect to the plane of the windshield.

2. The combination with the windshield of an automobile of a sunshade therefor comprising a pair of detachable supporting brackets, a rectangular frame having an opaque covering, lugs at the mid-portion of the ends of the frame for its support, notched disks to connect the frame and brackets and thumb screws for holding the frame in place in any given adjustment with respect to the windshield.

In testimony whereof I have hereunto set my hand this 20th day of April A. D. 1917.

DANIEL E. HOFFMAN.